United States Patent
Miyairi

(10) Patent No.: US 9,163,538 B2
(45) Date of Patent: Oct. 20, 2015

(54) FINE PARTICLE COLLECTING FILTER

(71) Applicant: NGK INSULATORS, LTD., Nagoya (JP)

(72) Inventor: Yukio Miyairi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 36 days.

(21) Appl. No.: 14/104,278

(22) Filed: Dec. 12, 2013

(65) Prior Publication Data

US 2014/0165519 A1 Jun. 19, 2014

(30) Foreign Application Priority Data

Dec. 18, 2012 (JP) ................ 2012-275265

(51) Int. Cl.
*B01D 39/14* (2006.01)
*B01D 39/06* (2006.01)
*B01D 39/20* (2006.01)
(Continued)

(52) U.S. Cl.
CPC .......... *F01N 3/0222* (2013.01); *B01D 46/2429* (2013.01); *C04B 35/565* (2013.01); *C04B 37/005* (2013.01); *C04B 38/0009* (2013.01); *B01D 46/2444* (2013.01); *B01D 2046/2437* (2013.01); *C04B 2111/00793* (2013.01); *C04B 2201/32* (2013.01); *C04B 2235/3206* (2013.01); *C04B 2235/3225* (2013.01); *C04B 2235/3244* (2013.01); *C04B 2235/3826* (2013.01); *C04B 2235/5436* (2013.01); *C04B 2235/5445* (2013.01); *C04B 2235/5472* (2013.01); *C04B 2235/606* (2013.01); *C04B 2235/9607* (2013.01); *C04B 2237/083* (2013.01); *C04B 2237/365* (2013.01)

(58) Field of Classification Search
CPC .............. C04B 38/0006; F01N 3/0222; F01N 2330/60; B01D 2046/2437; B01D 2239/1216; B01D 46/2429
See application file for complete search history.

(56) References Cited

U.S. PATENT DOCUMENTS

| 5,733,352 A * | 3/1998 | Ogawa et al. .................. 55/523 |
| 8,444,739 B2 * | 5/2013 | Mizuno et al. ................. 55/523 |

(Continued)

FOREIGN PATENT DOCUMENTS

| EP | 0 336 883 A1 | 10/1989 |
| EP | 1 486 242 A1 | 12/2004 |

(Continued)

OTHER PUBLICATIONS

Extended European Search Report (Application No. 13197445.3) dated Jul. 7, 2014.

*Primary Examiner* — Amber Orlando
(74) *Attorney, Agent, or Firm* — Burr & Brown, PLLC

(57) ABSTRACT

A fine particle collecting filter includes a honeycomb structure in which a plurality of honeycomb segments are integrally joined by a joining material, and has a constitution where an exhaust gas allowed to flow from an inlet end surface into cells passes partition walls, and then flows out from an outlet end surface to the outsides of the cells. The partition walls are made of a material containing SiC as a main component, at least one of an average open diameter of pores of an inlet side of the exhaust gas passing the partition wall and an average open diameter of the pores of an outlet side of the exhaust gas passing is from 0.1 to 5 μm, an average pore diameter of the whole partition wall is from 10 to 30 μm, and a thermal conductivity of the partition walls at room temperature is from 80 to 110 W/mK.

8 Claims, 2 Drawing Sheets

(51) Int. Cl.
  *B01D 24/00* (2006.01)
  *F01N 3/022* (2006.01)
  *C04B 35/565* (2006.01)
  *C04B 38/00* (2006.01)
  *B01D 46/24* (2006.01)
  *C04B 37/00* (2006.01)
  *C04B 111/00* (2006.01)

(56) References Cited

U.S. PATENT DOCUMENTS

| | | | |
|---|---|---|---|
| 8,608,820 B2* | 12/2013 | Arnold et al. | 55/523 |
| 2003/0138596 A1 | 7/2003 | Harada et al. | |
| 2004/0191133 A1* | 9/2004 | Yamaguchi | 422/180 |
| 2007/0039297 A1* | 2/2007 | Kawata et al. | 55/523 |
| 2008/0264010 A1* | 10/2008 | Mizuno et al. | 55/350.1 |
| 2009/0321999 A1* | 12/2009 | Ogura | 264/630 |
| 2010/0086731 A1* | 4/2010 | Noguchi et al. | 428/116 |
| 2011/0167806 A1* | 7/2011 | Auroy et al. | 60/297 |
| 2011/0198772 A1* | 8/2011 | Watanabe | 264/46.6 |
| 2012/0009093 A1* | 1/2012 | Mizutani et al. | 422/177 |
| 2012/0240538 A1* | 9/2012 | Isoda et al. | 55/486 |
| 2012/0240541 A1* | 9/2012 | Isoda et al. | 55/523 |
| 2012/0317946 A1* | 12/2012 | Miyairi | 55/523 |

FOREIGN PATENT DOCUMENTS

| | | |
|---|---|---|
| EP | 2 502 662 A1 | 9/2012 |
| EP | 2 502 663 A1 | 9/2012 |
| JP | 2002-253916 A1 | 9/2002 |

* cited by examiner

FINE PARTICLE COLLECTING FILTER

FINE PARTICLE COLLECTING FILTER

The present application is an application based on JP-2012-275265 filed on Dec. 18, 2012 with the Japanese Patent Office, the entire contents of which are incorporated herein by reference.

BACKGROUND OF THE INVENTION

1. Field of the Invention

The present invention relates to a filter for collecting particulate materials included in an exhaust gas of an engine, especially a car engine.

2. Description of Related Art

A diesel engine has a good thermal efficiency as compared with a gasoline engine, and is advantageous as an engine for a car which meets demand for a decrease of $CO_2$ emissions as a global warming countermeasure. On the other hand, however, there has been the problem of generation of particulate materials (particulate matter (PM)) by diffusion burning.

This PM is mainly constituted of carbon fine particles of soot and the like, and it is recognized that the PM has carcinogenicity. Therefore, it is necessary to prevent the PM included in an exhaust gas of the car engine from being discharged to the atmospheric air, and strict emission regulations are imposed on the PM. Especially in recent years, the strictness of the PM emission regulations has increased remarkably, and in European Union (EU) and the like, emission regulations on the basis of the number of particulates of the PM are being introduced in addition to conventional emission regulations on the basis of a mass of the PM.

To cope with such strict emission regulations, many investigations have been conducted to decrease an amount of the PM emissions, but there is a limit to the decrease of the amount of the PM emissions by improvement of a burning technology. Therefore, at present, a method of disposing a filter in an exhaust system has been the only effective means for decreasing the amount of the PM emissions.

As the filter for collecting the PM, a wall flow type filter using a honeycomb structure has broadly been used, because a high PM collecting efficiency can be obtained while suppressing a pressure loss in an allowable range. This honeycomb structure has porous partition walls to define and form a plurality of cells extending from an inlet end surface that becomes an inlet side of an exhaust gas to an outlet end surface that becomes an outlet side of the exhaust gas, and plugging portions to plug open ends on the side of the outlet end surface of the predetermined cells and open ends on the side of the inlet end surface of the remaining cells.

In the filter using such a honeycomb structure, the exhaust gas allowed to flow from the inlet end surface into the cells passes the partition walls, and then flows out from the outlet end surface to the outsides of the cells. When the exhaust gas passes the partition walls, the partition walls function as filter layers, so that the PM included in the exhaust gas is collected.

Additionally, for using such a filter continuously for a long period of time, it is necessary to periodically subject the filter to a recovery treatment. That is, for decreasing the pressure loss increased due to the PM deposited in the filter with an elapse of the time to return a filter performance to an initial state, it is necessary to remove the PM deposited in the filter by burning the PM with a high temperature gas. Moreover, during this recovery, a heat stress is generated in the filter by heat of the burning of the PM, and hence the filter is damaged sometimes.

Heretofore, as a countermeasure for preventing such damage of the filter, it has been suggested that the whole filter is not manufactured as one honeycomb structure, but the honeycomb structure for the filter is manufactured by joining a plurality of segments having a honeycomb form (the honeycomb segments). Specifically, a segment structure joined and integrated by an easily deformable joining material having a low elastic modulus is provided between the plurality of honeycomb segments, to disperse and alleviate the heat stress which acts on the honeycomb structure during the recovery, whereby enhancement of a heat shock resistance is achieved (e.g., see Patent Document 1).

However, in the outlet end surface where the heat stress during the recovery is severest, an excessively large temperature rise occurs locally, though at very low frequency. Therefore, even in the filter using the honeycomb structure of the segment structure, the heat stress alleviating effect is not sufficiently obtained sometimes. In consequence, a low temperature portion is pulled due to thermal expansion of a high temperature portion in which the excessively large temperature rise has occurred, and a tensile stress is generated in the low temperature portion. As a result, there has been the problem that cracks are generated in this low temperature portion.

It is to be noted that from the viewpoint that the honeycomb structure is prevented from being damaged due to the local temperature rise of the honeycomb structure during the recovery of the filter, a material having a large heat capacity is preferably used. Therefore, it has been suggested that as a material of the honeycomb structure constituting the filter, a material containing silicon carbide as a main component is used. However, a thermal expansion coefficient of silicon carbide is excessively large, and hence there has been the problem that the damage due to the heat stress (heat stress cracks) is caused.

Moreover, a method has been also suggested in which a porosity of the material of the honeycomb structure for use in the filter is lowered to increase the heat capacity, and the temperature rise is suppressed to prevent the heat stress cracks. However, in this method, as a result of the lowered porosity, there has been the problem that pores of the partition walls that become the filter layers are easily clogged with the collected PM, and the pressure loss increases.

Furthermore, another method has been suggested in which constituent particles (an aggregate) of the material of the honeycomb structure for use in the filter are increased, to enhance a thermal conductivity and to suppress the temperature rise, whereby the heat stress cracks are suppressed. However, in this method, the pores get excessively large, and hence there has been the problem that a PM collecting efficiency deteriorates.

Additionally, a further method has been contrived in which the pores of the honeycomb structure for use in the filter are increased in size and Young's modulus of the material is lowered, to increase a strength/Young's modulus ratio and to heighten a limitation of strain which reaches the heat stress cracks, whereby the heat stress cracks are prevented. However, also in this method, as a result of the increased pores, there has been the problem that the PM collecting efficiency deteriorates.

[Patent Document 1] JP-A-2002-253916

SUMMARY OF THE INVENTION

The present invention has been developed in view of such situations, and an object thereof is to provide a fine particle collecting filter which enables effectively preventing damage due to a heat stress generated during recovery, without increasing a pressure loss or deteriorating a PM collecting efficiency.

To achieve the above object, according to the present invention, there is provided a fine particle collecting filter in the following.

[1] A fine particle collecting filter including a honeycomb structure in which a plurality of honeycomb segments are integrally joined by a joining material, each of the honeycomb segments having porous partition walls to define and form a plurality of cells extending from an inlet end surface that becomes an inlet side of an exhaust gas to an outlet end surface that becomes an outlet side of the exhaust gas, and plugging portions to plug open ends on the side of the outlet end surface of the predetermined cells and open ends on the side of the inlet end surface of the remaining cells, the fine particle collecting filter having a constitution where the exhaust gas allowed to flow from the inlet end surface into the cells passes the partition walls, and then flows out from the outlet end surface to the outsides of the cells, wherein the partition walls are made of a material containing SiC as a main component, at least one of an average open diameter of the pores which are open in a surface of each of the partition walls that becomes the inlet side of the exhaust gas passing the partition wall and an average open diameter of the pores which are open in a surface of the partition wall that becomes the outlet side of the exhaust gas passing the partition wall is from 0.1 to 5 μm, an average pore diameter of the whole partition wall is from 10 to 30 and a thermal conductivity of the partition walls at room temperature is from 80 to 110 W/mK.

[2] The fine particle collecting filter according to the above [1], wherein a porosity of the partition walls is from 34 to 43%.

[3] The fine particle collecting filter according to the above [1] or [2], wherein a cell density of the honeycomb structure is from 23 to 50 cells/cm$^2$.

[4] The fine particle collecting filter according to any one of the above [1] to [3], wherein a thickness of the partition walls is from 120 to 180 μm.

According to the fine particle collecting filter of the present invention, it is possible to alleviate a heat stress generated during recovery and effectively prevent damage of the filter due to the heat stress, without increasing a pressure loss or deteriorating a PM collecting efficiency.

DETAILED DESCRIPTION OF THE INVENTION

Hereinafter, the present invention will be described on the basis of a specific embodiment, but the present invention is not limited to this embodiment when the invention is interpreted. Moreover, various changes, modifications and improvements can be added to the present invention on the basis of knowledge of a person skilled in the art without departing from the gist of the present invention.

Figure 1:
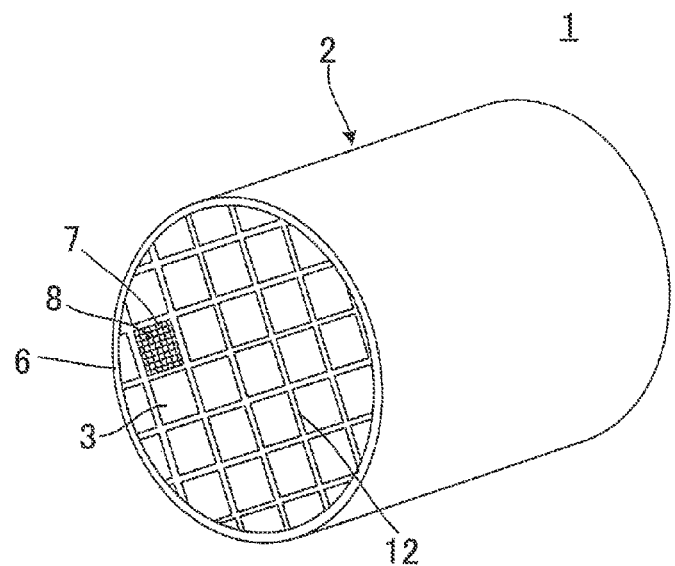
FIG. 1 is a perspective schematic view showing one example of an embodiment of a fine particle collecting filter according to the present invention.
Figure 2:
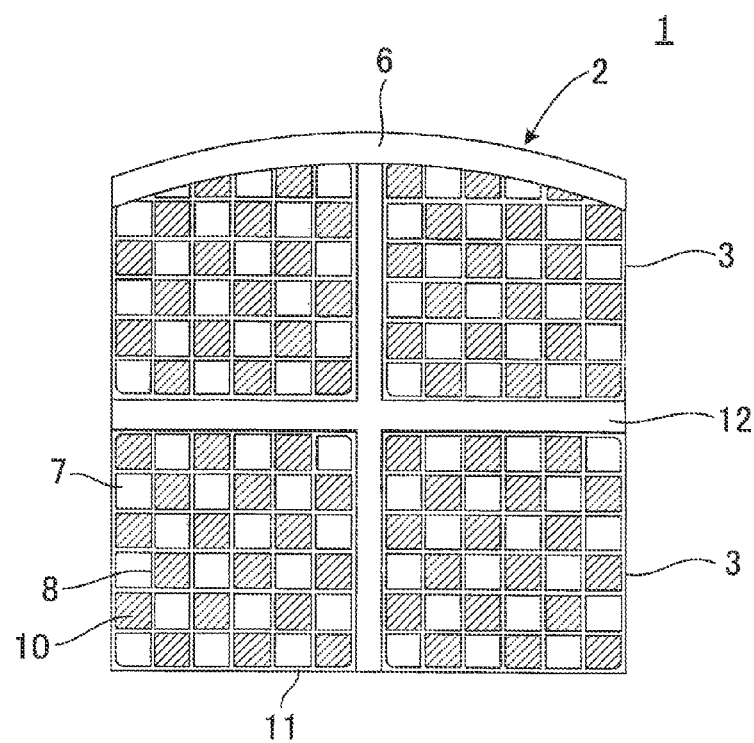
FIG. 2 is an enlarged view of a main part of FIG. 1.
Figure 3:
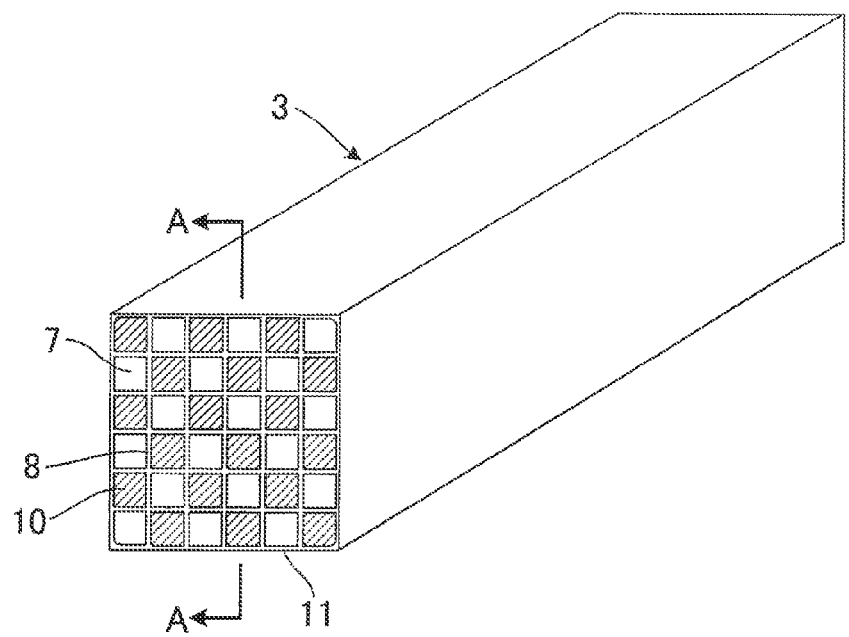
FIG. 3 is a perspective schematic view of a honeycomb segment which is used in the one example of the embodiment of the fine particle collecting filter according to the present invention.
Figure 4:
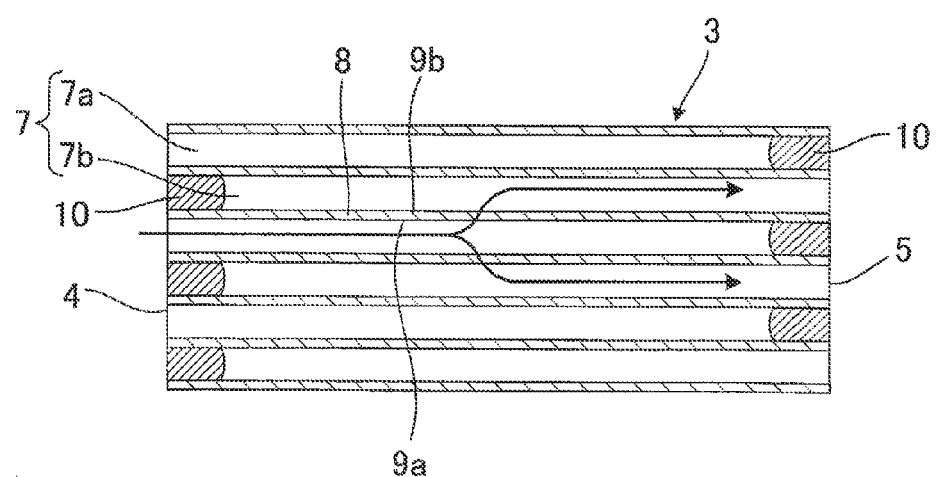
FIG. 4 is a cross sectional view cut along the A-A line of FIG. 3.

(1) Fine Particle Collecting Filter:

FIG. 1 is a perspective schematic view showing one example of an embodiment of a fine particle collecting filter according to the present invention, and FIG. 2 is an enlarged view of a main part of FIG. 1. Moreover, FIG. 3 is a perspective schematic view of a honeycomb segment which is used in the one example of the embodiment of the fine particle collecting filter according to the present invention, and FIG. 4 is a cross sectional view cut along the A-A line of FIG. 3.

A fine particle collecting filter 1 according to the present invention includes a honeycomb structure 2 as shown in FIG. 1. As shown in FIG. 1 and FIG. 2, in the honeycomb structure 2, a plurality of honeycomb segments 3 are integrally joined by a joining material 12. As shown in FIG. 3 and FIG. 4, each of the honeycomb segments 3 has porous partition walls 8 to define and form a plurality of cells 7 extending from an inlet end surface 4 that becomes an inlet side of an exhaust gas to an outlet end surface 5 that becomes an outlet side of the exhaust gas. Moreover, each of the honeycomb segments 3 has plugging portions 10 to plug open ends on the side of the outlet end surface 5 of predetermined cells 7a and open ends on the side of the inlet end surface 4 of remaining cells 7b. The predetermined cells 7a whose open ends on the outlet end surface 5 side are plugged with the plugging portions 10 and the remaining cells 7b whose open ends on the inlet end surface 4 side are plugged with the plugging portions 10 are preferably alternately arranged so that the inlet end surface 4 and the outlet end surface 5 show complementary checkered patterns.

The fine particle collecting filter 1 according to the present invention includes the honeycomb structure 2, and hence has a constitution where the exhaust gas allowed to flow from the inlet end surface 4 into the cells passes the partition walls 8, and then flows out from the outlet end surface 5 to the outsides of the cells. That is, the exhaust gas including a PM first flows into the predetermined cells 7a in which open frontal areas on the inlet end surface 4 side are not plugged, and open frontal areas on the outlet end surface 5 side are plugged. Next, the exhaust gas allowed to flow into the predetermined cells 7a passes the porous partition walls 8, to move into the remaining cells 7b in which open frontal areas on the inlet end surface 4 side are plugged, and open frontal areas on the outlet end surface 5 side are not plugged. Moreover, when the exhaust gas passes the porous partition walls 8, the partition walls 8 become filter layers, and the PM in the exhaust gas is collected by the partition walls 8 and deposited on the partition walls 8. In this way, the exhaust gas from which the PM has been removed moves into the remaining cells 7b, and then flows out from the outlet end surface 5 to the outsides of the remaining cells 7b.

In the fine particle collecting filter 1 according to the present invention, the partition walls 8 are made of a material containing SiC as a main component. Here, "containing SiC as the main component" means that a content of SiC is 90 mass % or more of the material forming the partition walls 8. An especially preferable example of SiC that becomes the main component of the material forming the partition walls 8 is recrystallized SiC. Recrystallized SiC is prepared by sintering SiC powder by a recrystallization reaction of the SiC powder itself. Recrystallized SiC has an especially high thermal conductivity also in SiC materials. Therefore, when this material is used as the main component of a forming material of the partition walls 8, the fine particle collecting filter 1 having a good thermal conductivity can be obtained.

The partition wall 8 which becomes the filter layer has two surfaces in a mutual back and front relation. One of these two surfaces is a surface (hereinafter referred to as "the inlet side partition wall surface") 9a of the partition wall 8 which becomes an inlet side of the exhaust gas passing the partition wall 8, and the other surface is a surface (hereinafter referred to as "the outlet side partition wall surface") 9b of the partition wall 8 which becomes an outlet side of the exhaust gas passing the partition wall 8.

In the fine particle collecting filter 1 according to the present invention, at least one of an average open diameter of the pores which are open in the inlet side partition wall surface 9a and an average open diameter of the pores which are open in the outlet side partition wall surface 9b is from 0.1 to 5 µm, and preferably from 0.1 to 3 µm. When at least one of the average open diameter of the pores which are open in the inlet side partition wall surface 9a and the average open diameter of the pores which are open in the outlet side partition wall surface 9b is in such a range, a high PM collecting efficiency can be exerted while keeping a pressure loss in a suitable range.

When each of the average open diameter of the pores which are open in the inlet side partition wall surface 9a and the average open diameter of the pores which are open in the outlet side partition wall surface 9b is smaller than 0.1 µm, a high PM collecting efficiency can be obtained, but the pressure loss is excessively large. Moreover, this also applies to a case where one of the average open diameter of the pores which are open in the inlet side partition wall surface 9a and the average open diameter of the pores which are open in the outlet side partition wall surface 9b is smaller than 0.1 µm and the other average open diameter is in excess of 5 µm. Furthermore, when each of the average open diameter of the pores which are open in the inlet side partition wall surface 9a and the average open diameter of the pores which are open in the outlet side partition wall surface 9b is in excess of 5 the pressure loss is small, but the PM collecting efficiency deteriorates. It is to be noted that the average open diameter of the pores which are open in the inlet side partition wall surface 9a and the average open diameter of the pores which are open in the outlet side partition wall surface 9b can be measured by mercury porosimetry (in conformity to JIS R 1655).

In the fine particle collecting filter 1 according to the present invention, an average pore diameter of the whole partition wall 8 is from 10 to 30 µm, and preferably from 10 to 25 µm. Even when at least one of the average open diameter of the pores which are open in the inlet side partition wall surface 9a and the average open diameter of the pores which are open in the outlet side partition wall surface 9b has a small value of 0.1 to 5 µm, the excessive increase of the pressure loss can be prevented in a case where the average pore diameter of the whole partition wall 8 is from 10 to 30 µm.

When the average pore diameter of the whole partition wall 8 is smaller than 10 µm, the excessive increase of the pressure loss cannot be prevented, and when the average pore diameter is in excess of 30 µm, the PM collecting efficiency deteriorates and it is difficult to obtain a sufficient strength. It is to be noted that the average pore diameter of the whole partition wall 8 can be measured by the mercury porosimetry (in conformity to JIS R 1655).

In the fine particle collecting filter 1 according to the present invention, a thermal conductivity of the partition walls 8 at room temperature is from 80 to 110 W/mK, and preferably from 90 to 110 W/mK. When the thermal conductivity of the partition walls 8 at room temperature is in such a range, a local temperature rise during recovery of the filter is suppressed and a heat stress is alleviated, whereby damage due to the heat stress can effectively be prevented. Additionally, "room temperature" mentioned herein specifically means that the temperature is about 25° C.

When the thermal conductivity of the partition walls 8 at room temperature is smaller than 80 W/mK, the local temperature rise during the filter recovery cannot sufficiently be suppressed. Therefore, it is difficult to prevent the damage due to the heat stress. Moreover, the thermal conductivity of the partition walls 8 at room temperature can mainly be controlled by a size of SiC particles (the aggregate) in a forming material of the partition walls 8. However, for obtaining the partition walls 8 having a thermal conductivity in excess of 110 W/mK at room temperature, it is necessary to use the considerably large aggregate at a high content ratio. In this case, the pores formed in the aggregates excessively increase, and hence the PM collecting efficiency deteriorates. It is to be noted that the thermal conductivity of the partition walls 8 at room temperature can be measured by a steady state method.

In the fine particle collecting filter 1 according to the present invention, a porosity of the partition walls 8 is preferably from 34 to 43%, and more preferably from 36 to 42%. When the porosity of the partition walls 8 is in such a range, it is easy to suppress the local temperature rise during the filter recovery and to alleviate the heat stress while keeping the pressure loss in the suitable range, whereby the damage due to the heat stress is easily effectively prevented.

When the porosity of the partition walls 8 is smaller than 34%, the high thermal conductivity can be obtained, and the damage due to the heat stress during the filter recovery can effectively be prevented, but the excessive increase of the pressure loss occurs sometimes. Moreover, when the porosity of the partition walls 8 is in excess of 43%, the pressure loss can be small. However, the thermal conductivity gets excessively low, and hence it is difficult to prevent the damage due to the heat stress during the filter recovery sometimes. It is to be noted that the porosity of the partition walls 8 can be calculated from a total pore volume [cm$^3$/g] measured by the mercury porosimetry (in conformity to JIS R 1655) and an apparent density [g/cm$^3$] measured by Archimedes method by the following equation.

$$\text{Porosity (\%)} = 100 \times \text{total pore volume} / \{(1/\text{apparent density}) + \text{total pore volume}\}$$

In the fine particle collecting filter 1 according to the present invention, a cell density of the honeycomb structure 2 is preferably from 23 to 50 cells/cm$^2$, and more preferably from 30 to 48 cells/cm$^2$. When the cell density of the honeycomb structure 2 is in such a range, it is easy to suppress the local temperature rise during the filter recovery and to alleviate the heat stress while keeping the pressure loss in the suitable range, whereby the damage due to the heat stress is easily effectively prevented.

When the cell density of the honeycomb structure 2 is smaller than 23 cells/cm$^2$, the pressure loss can be small. However, the thermal conductivity is excessively low, and hence it is difficult to prevent the damage due to the heat stress during the filter recovery sometimes. Moreover, when the cell density of the honeycomb structure is in excess of 50 cells/cm$^2$, the high thermal conductivity can be obtained, and the damage due to the heat stress during the filter recovery can effectively be prevented. However, the excessive increase of the pressure loss occurs sometimes.

In the fine particle collecting filter 1 according to the present invention, a thickness of the partition walls 8 is preferably from 120 to 180 µm, and more preferably from 120 to 150 µm. When the thickness of the partition walls 8 is in such a range, it is easy to suppress the local temperature rise during the filter recovery and to alleviate the heat stress while keeping the pressure loss in the suitable range, whereby the damage due to the heat stress is easily effectively prevented.

When the thickness of the partition walls 8 is smaller than 120 μm, the pressure loss can be small. However, the thermal conductivity is excessively low, and hence it is difficult to prevent the damage due to the heat stress during the filter recovery sometimes. Moreover, when the thickness of the partition walls 8 is in excess of 180 μm, the high thermal conductivity can be obtained, and the damage due to the heat stress during the filter recovery can effectively be prevented. However, the excessive increase of the pressure loss occurs sometimes.

In the fine particle collecting filter 1 according to the present invention, there is not any special restriction on a shape of the honeycomb structure 2, and examples of the shape include a tubular shape with round end surfaces (a cylindrical shape), a tubular shape with oval end surfaces, and a tubular shape with end surfaces having a polygonal shape (a quadrangular shape, a pentangular shape, a hexagonal shape, a heptagonal shape, an octagonal shape or the like). There is not any special restriction on a cell shape of the honeycomb structure 2 (the shape of the cells in a cross section perpendicular to a cell extending direction), but the shape is preferably a polygonal shape such as the quadrangular shape, the hexagonal shape or the octagonal shape.

In the fine particle collecting filter 1 according to the present invention, as a forming material of the plugging portions 10, the same material as the forming material of the partition walls 8 is preferably used. In this case, a difference in thermal expansion between the partition wall 8 and the plugging portion 10 can be small, and the heat stress generated between the partition wall 8 and the plugging portion 10 can be alleviated.

In the fine particle collecting filter 1 according to the present invention, the joining material 12 by which the plurality of honeycomb segments 3 are integrally joined preferably includes inorganic particles and a colloidal oxide.

As the inorganic particles included in the joining material 12, there can suitably be used particles made of, for example, a ceramic material selected from the group consisting of silicon carbide, silicon nitride, cordierite, alumina, mullite, zirconia, zirconium phosphate, aluminum titanate, titania and any combination of these materials; an Fe—Cr—Al metal; a nickel metal; a silicon-silicon carbide composite material; or the like.

Suitable examples of the colloidal oxide include silica sol and alumina sol. The colloidal oxide suitably imparts a proper bonding force to the joining material. Moreover, when the colloidal oxide is dried or dehydrated, the colloidal oxide combines with the inorganic particles, so that the dried joining material can be a solid material having an excellent heat resistance or the like.

Moreover, at the joining of the honeycomb segments, there can suitably be used the slurried joining material obtained by adding an organic binder such as methylcellulose or carboxymethylcellulose, a dispersant, water and the like, if necessary, in addition to the above components, and mixing and kneading the components by use of a kneader such as a mixer.

A thickness of the joining material 12 is determined in consideration of a joining force among the honeycomb segments 3, and suitably selected in a range of, for example, 0.5 to 3.0 mm.

The fine particle collecting filter 1 according to the present invention may include constituent elements other than the honeycomb structure 2, in addition to the above honeycomb structure 2. Examples of the constituent elements other than the honeycomb structure 2 in the fine particle collecting filter 1 include a tubular can member for canning in which the honeycomb structure 2 is contained, and a compressive elastic material such as a ceramic fiber mat to be disposed between an inner peripheral surface of the can member for canning and an outer peripheral surface of the honeycomb structure 2.

The fine particle collecting filter 1 according to the present invention can be used as a filter for collecting the PM included in the exhaust gas of a car engine or the like. In particular, the filter can suitably be used as a diesel particulate filter (DPF) for collecting the PM mainly composed of carbon fine particles of soot and the like included in the exhaust gas of a diesel engine.

(2) Manufacturing Method of Fine Particle Collecting Filter:

As one example of a manufacturing method of the fine particle collecting filter according to the present invention, first, silicon carbide powder that becomes an aggregate and a sintering auxiliary agent are mixed, and, if necessary, a binder, a surfactant, a pore former, water and the like are added, to prepare a forming raw material.

As the silicon carbide powder, small particle diameter powder having an average particle diameter of 0.1 to 10 μm and large particle diameter powder having an average particle diameter of 50 to 100 μm are preferably mixed and used. A mass ratio of the small particle diameter powder to the large particle diameter powder is preferably from 1 to 50 mass %. It is to be noted that "the average particle diameter" mentioned herein is a value measured by a laser diffraction method.

As the sintering auxiliary agent, for example, yttria, magnesia, strontium oxide or the like can be used. A content of the sintering auxiliary agent is preferably from 0.1 to 0.3 mass % of the whole forming raw material.

An example of the binder is an organic binder such as methylcellulose, hydroxypropoxylcellulose, hydroxyethylcellulose, carboxymethylcellulose, or polyvinyl alcohol. Among these binders, methylcellulose and hydroxypropoxylcellulose are preferably used together. A content of the binder is preferably from 2 to 10 mass % of the whole forming raw material.

As the surfactant, ethylene glycol, dextrin, fatty acid soap, polyalcohol or the like can be used. One of these surfactants may be used alone, or a combination of two or more of the surfactants may be used. A content of the surfactant is preferably 2 mass % or less of the whole forming raw material.

There is not any special restriction on the pore former as long as the pore former forms the pores after the firing, and examples of the pore former include graphite, starch, resin balloons, a water-absorbing resin and silica gel. A content of the pore former is preferably 10 mass % or less of the whole forming raw material. An average particle diameter of the pore former is preferably from 10 to 30 μm. When the average particle diameter of the pore former is smaller than 10 μm, the pores cannot sufficiently be formed sometimes. Moreover, when the average particle diameter of the pore former is larger than 30 μm, die for forming is clogged with the pore former sometimes during the forming. It is to be noted that "the average particle diameter" mentioned herein is a value measured by the laser diffraction method. Moreover, when the pore former is the water-absorbing resin, the average particle diameter of the resin is a value after water absorption.

A content of the water is suitably regulated so that a kneaded material obtained by kneading the forming raw material has such a hardness as to facilitate the forming of the kneaded material. A specific content of the water is preferably from 20 to 80 mass % of the whole forming raw material.

Next, the forming raw material is kneaded to form the kneaded material. There is not any special restriction on a method of kneading the forming raw material to form the kneaded material, and an example of the method is a method using a kneader, a vacuum clay kneader or the like.

Next, the kneaded material is extruded to form a formed honeycomb body. In the extrusion forming, it is preferable to use a die corresponding to a desirable whole shape, cell shape, partition wall thickness, cell density and the like of the formed honeycomb body to be obtained. As a material of the die, a hard metal that does not easily wear away is preferable. The formed honeycomb body is a formed body having partition walls to define and form a plurality of cells that become through channels of the exhaust gas, and an outer peripheral wall positioned in the outermost periphery. A partition wall thickness, cell density, outer peripheral wall thickness and the like of the formed honeycomb body can suitably be determined in accordance with a dimension and structure of the honeycomb segments to be prepared in consideration of shrinkage in the drying and the firing.

The formed honeycomb body obtained in this way is preferably dried prior to the firing. There is not any special restriction on a drying method, and examples of the method include an electromagnetic heating system such as microwave heating drying or high-frequency dielectric heating drying, and an external heating system such as hot air drying or superheat steam drying. In these examples, after drying a predetermined amount of a water content by the electromagnetic heating system, the remaining water content is preferably dried by the external heating system, because the whole formed body can rapidly and evenly be dried so that any cracks are not generated. As preferable drying conditions, the water content of 30 to 99 mass % of the water content prior to the drying is removed by the electromagnetic heating system, and then the water content is decreased to 3 mass % or less by the external heating system. As the electromagnetic heating system, the dielectric heating drying is preferable, and as the external heating system, the hot air drying is preferable.

When a length of the formed honeycomb body in the cell extending direction is not a desirable length, both end surfaces (both ends) are preferably cut to obtain the desirable length. There is not any special restriction on a cutting method, but an example of the method is a method using a circular saw cutter or the like.

Next, the formed honeycomb body is fired to prepare the honeycomb segment. To remove the binder and the like, calcinating (degreasing) is preferably performed prior to the firing. The calcinating is preferably performed at 200 to 600° C. in the air atmosphere for 0.5 to 20 hours. In the firing, heating is preferably performed at 1800 to 2200° C. in a non-oxidizing atmosphere of nitrogen, argon or the like (an oxygen partial pressure is $10^{-4}$ atmospheres or less) under normal pressure for one to 20 hours. It is to be noted that the calcinating and the firing can be performed using, for example, an electric furnace, a gas furnace or the like.

After the firing, the plugging portions are formed in the obtained honeycomb segment. To form the plugging portions, a heretofore known method can be used. As one specific example of the method, first, a sheet is attached to an end surface of the honeycomb segment prepared by the above method. Next, holes are made at positions of this sheet which correspond to the cells to be provided with the plugging portions. Next, in a state where this sheet is left attached, the end surface of the honeycomb segment is immersed into a plugging slurry obtained by slurring the forming material of the plugging portions, and the plugging slurry is charged into open ends of the cells to be plugged, through the holes made in the sheet. The plugging slurry charged in this manner is dried, and then hardened by the firing, to form the plugging portions. It is to be noted that as the forming material of the plugging portions, the same material as a forming material of the honeycomb segments is preferably used.

The plurality of honeycomb segments in which the plugging portions are formed in this way are prepared, and the slurried joining material is applied to the surfaces of outer peripheral walls of the honeycomb segments. Then, the honeycomb segments are assembled so as to form a predetermined three-dimensional shape, and the honeycomb segments are heated and dried, while pressing the honeycomb segments in the assembled state. Consequently, the honeycomb structure is obtained in which the plurality of honeycomb segments are joined and integrated via the joining material. As a forming material of the joining material, for example, a material can be used which is obtained by adding a colloidal oxide such as silica sol to inorganic particles such as silicon carbide powder.

Additionally, when the predetermined shape of the honeycomb structure cannot be obtained simply by assembling the plurality of honeycomb segments, the honeycomb segments are joined and integrated, and then an outer peripheral portion of the honeycomb structure is subjected to grind processing so that the honeycomb structure obtains a predetermined shape. In this case, the cells are exposed in the outer peripheral surface (the processed surface) of the honeycomb structure after the grind processing, and hence the outer peripheral surface is preferably coated with a coating material 6 as shown in FIG. 1. In a forming material of the coating material 6, the same material as the forming material of the joining material 12 is preferably used.

In the honeycomb structure obtained in this way, the average pore diameter of the whole partition wall is from about 10 to 30 μm. At this time, the average open diameter of the pores which are open in the surfaces of the partition wall is of the same degree as in the average pore diameter of the whole partition wall. Therefore, this honeycomb structure is treated so that at least one of the average open diameter of the pores which are open in the inlet side partition wall surface and the average open diameter of the pores which are open in the outlet side partition wall surface is from 0.1 to 5 μm.

For example, when the average open diameter of the pores which are open in the inlet side partition wall surface is set to a range of 0.1 to 5 μm, first the inlet end surface of the honeycomb structure is turned upwards, and a slurry pool to pool a slurry is attached to an upper portion of the honeycomb structure. Next, the slurry for decreasing the open diameters of the pores which are open in the partition wall surfaces is poured into this slurry pool. This slurry is preferably obtained by dispersing, in water, the silicon carbide powder that becomes aggregate particles having particle diameters of 0.1 to 10 μm and colloidal silica that becomes binding particles for binding the aggregate particles in the open frontal areas of the pores which are open in the partition wall surfaces.

Next, the slurry poured into the slurry pool is allowed to flow into the cells in which the open ends on the outlet end surface side are plugged (the cells in which the open ends on the inlet end surface side are not plugged) through holes made in a bottom portion of the slurry pool, so that the slurry is impregnated into partition wall surface layer portions from inlet side partition wall surfaces. Afterward, a suction jig is attached to the outlet end surface of the honeycomb structure, and suction is performed from the outlet end surface side by this suction jig, thereby removing an excessive water content and then performing a heat treatment at about 700° C. By this heat treatment, the honeycomb structure is dried, and the fine aggregate particles included in the slurry are bound to the open frontal areas of the pores which are open in each inlet side partition wall surface. As a result, the open diameters of the pores which are open in the inlet side partition wall surface are small, and hence the fine particle collecting filter according to the present invention can be obtained in which the average open diameter of the pores which are open in the inlet side partition wall surface is from 0.1 to 5 μm, although the average pore diameter of the whole partition wall is from 10 to 30 μm.

Additionally, when the average open diameter of the pores which are open in each outlet side partition wall surface is set to a range of 0.1 to 5 μm, a vertical relation between the inlet end surface and the outlet end surface of the honeycomb structure may be reversed, and then an operation similar to the above operation may be performed. Moreover, a method of controlling the average open diameter of the pores which are open in the partition wall surfaces is not limited to such a method as described above. For example, not in the honeycomb structure but in a stage of the formed honeycomb body prior to the firing, the above slurry may be impregnated into the partition wall surface layer portions. Moreover, an airflow including such fine aggregate particles as used in the above slurry may be allowed to flow into the cells of the honeycomb structure, and the fine aggregate particles may be collected by the partition walls. Afterward, the heat treatment of the aggregate particles may be performed, so that the aggregate particles may be bound to the open frontal areas of the pores which are open in the partition wall surfaces.

Examples

Hereinafter, the present invention will be described in more detail with respect to examples, but the present invention is not limited to these examples.

Examples 1 to 25 and Comparative Examples 1 to 6

There were mixed 50 parts by mass of silicon carbide powder (small particle diameter powder) having an average particle diameter of 0.1 μm and 50 parts by mass of silicon carbide powder (large particle diameter powder) having an average particle diameter of 80 μm, to obtain the mixed powder that becomes an aggregate having an average particle diameter of 22.0 μm. To 100 parts by mass of this mixed powder, there were added a total of 1 part by mass of magnesia, yttria and zirconia as sintering auxiliary agents, 7 parts by mass of hydroxypropyl methylcellulose as a binder, a total of 12 parts by mass of starch and a water-absorbing resin having an average particle diameter of 20 μm as pore formers, and 70 parts by mass of water, to obtain a forming raw material. Additionally, the average particle diameters of the silicon carbide powder and the pore formers were values measured by a laser diffraction method.

Next, the forming raw material was mixed and kneaded to prepare a columnar kneaded material. Then, the obtained columnar kneaded material was formed into a honeycomb shape by use of an extrusion forming machine, to obtain a formed honeycomb body. The obtained formed honeycomb body was dielectrically heated and dried, and then dried at 120° C. for two hours by use of a hot air drier, to obtain a dried honeycomb body.

Next, a plugging portion was formed at one open end of each cell of this dried honeycomb body. The plugging portions were formed so that respective end surfaces (an inlet end surface and an outlet end surface) of a honeycomb structure showed checkered patterns by cells having the plugging portions which were formed at open ends and cells having the plugging portions which were not formed at open ends. As a method of forming the plugging portions, first, a sheet was attached to the end surface of the dried honeycomb body, and holes were made at positions of this sheet which corresponded to the cells to be provided with the plugging portions. Next, in a state where this sheet was left attached, the end surface of the dried honeycomb body was immersed into a plugging slurry obtained by slurring a forming material of the plugging portions, and the plugging slurry was charged into the open ends of the cells to be plugged, through the holes made in the sheet. Additionally, the same material as the above forming raw material was used in the forming material of the plugging portions.

The plugging slurry charged into the open ends of the cells in this way was dried, and then this dried honeycomb body was calcinated (degreased) at 550° C. in the air atmosphere for three hours. Afterward, the honeycomb body was fired at about 2050° C. in an Ar inert atmosphere for two hours, to obtain a honeycomb segment in which respective end surfaces (the inlet end surface and the outlet end surface) had a square shape with each side of 35 mm, and a length in an axial direction (a cell extending direction) was 152 mm.

Next, silicon carbide powder having an average particle diameter of 20 μm was mixed with an aqueous silica sol solution to obtain a slurried joining material. There was repeated a process of applying this joining material to the surface of an outer peripheral wall of the honeycomb segment in a thickness of about 1 mm, and disposing another honeycomb segment on the honeycomb segment, to prepare a stacked honeycomb segment assembly constituted of 16 honeycomb segments in total which were assembled in four segments×four segments. Then, the stacked honeycomb segment assembly was dried at 120° C. for two hours, while pressing the honeycomb segments constituting the stacked honeycomb segment assembly onto one another suitably by application of a pressure from the outside, or the like, to obtain a joined honeycomb segment assembly.

An outer periphery of this joined honeycomb segment assembly was ground so that an outer shape of the joined honeycomb segment assembly was columnar. Afterward, a coating material of the same composition as in the joining material was applied to a processed surface of the joined honeycomb segment assembly, followed by drying and hardening at 700° C. for two hours. In this way, a honeycomb structure was obtained in which the respective end surfaces (the inlet end surface and the outlet end surface) had a round shape with a diameter of 144 mm, and a length in the axial direction was 152 mm. Additionally, at this time, each of an average open diameter of pores which were open in an inlet side partition wall surface and an average open diameter of pores which were open in an outlet side partition wall surface was 30 μm.

Next, for this honeycomb structure, there was performed a treatment for decreasing the average open diameter of the pores which were open in the inlet side partition wall surface and/or the average open diameter of the pores which were open in the outlet side partition wall surface.

As the treatment for decreasing the average open diameter of the pores which were open in the inlet side partition wall surface, first, the inlet end surface of the honeycomb structure was turned upwards, and a slurry pool to pool a slurry was attached to an upper portion of the honeycomb structure. Next, into this slurry pool, there was poured the slurry obtained by dispersing, in water, silicon carbide powder that became aggregate particles having particle diameters of 0.1 to 10 μm and colloidal silica that became binding particles for binding the aggregate particles to open frontal areas of the pores which were open in the partition wall surfaces.

Next, the slurry poured into the slurry pool was allowed to flow into the cells in which the open ends on an outlet end surface side were plugged (the cells in which the open ends on an inlet end surface side were not plugged) through holes made in a bottom portion of the slurry pool, so that the slurry is impregnated into partition wall surface layer portions from inlet side partition wall surfaces. Afterward, a suction jig was attached to the outlet end surface of the honeycomb structure, and suction was performed from the outlet end surface side by this suction jig, thereby removing an excessive water content and then performing a heat treatment at a temperature of about 700° C. By this heat treatment, the honeycomb structure was dried, and the fine aggregate particles included in the slurry were bound to the open frontal areas of the pores which were open in each inlet side partition wall surface. As a result, the open diameters of the pores were made smaller.

A treatment for decreasing the average open diameter of the pores which were open in the outlet side partition wall surface was performed by an operation similar to that of the treatment for decreasing the average open diameter of the pores which were open in the inlet side partition wall surface, except that a vertical relation between the inlet end surface and the outlet end surface of the honeycomb structure was reversed.

By performing such a treatment, fine particle collecting filters of Examples 1 to 25 and Comparative Examples 1 to 6 constituted of such honeycomb structures as shown in Table 1 were finally obtained. Additionally, among items shown in Table 1, an average open diameter of pores open in an inlet side partition wall surface, an average open diameter of pores open in an outlet side partition wall surface, an average pore diameter of the whole partition wall, a porosity of the partition walls and a thermal conductivity of the partition walls were obtained by methods which will be described in the following, respectively.

[Average open diameter of Pores open in Inlet Side Partition Wall Surface, Average open diameter of Pores open in Outlet Side Partition Wall Surface, and Average Pore Diameter of Whole Partition Wall]:

The diameters were measured by mercury porosimetry (in conformity to JIS R 1655).

[Porosity of Partition Wall]:

The porosity was calculated from a total pore volume [cm$^3$/g] measured by the mercury porosimetry (in conformity to JIS R 1655) and an apparent density [g/cm$^3$] measured by Archimedes method by the following equation.

Porosity (%)=100×total pore volume/{(1/apparent density)+total pore volume}

[Thermal Conductivity of Partition Wall]:

The thermal conductivity was measured by a steady state method.

TABLE 1

| | Ave. open dia. of pores open in inlet side partition wall surface (μm) | Ave. open dia. of pores open in outlet side partition wall surface (μm) | Ave. pore dia. of whole partition wall (μm) | Porosity of partition wall (%) | Thermal conductivity of partition wall (%) | Thickness of partition wall (μm) | Cell density of honeycomb structure (cells/cm$^2$) |
|---|---|---|---|---|---|---|---|
| Example 1 | 0.1 | 0.1 | 18 | 40 | 85 | 150 | 46 |
| Example 2 | 0.3 | 0.3 | 18 | 40 | 85 | 150 | 46 |
| Example 3 | 2 | 2 | 18 | 40 | 85 | 150 | 46 |
| Example 4 | 5 | 5 | 18 | 40 | 85 | 150 | 46 |
| Example 5 | 0.3 | 20 | 18 | 40 | 85 | 150 | 46 |
| Example 6 | 2 | 20 | 18 | 40 | 85 | 150 | 46 |
| Example 7 | 20 | 0.4 | 18 | 40 | 85 | 150 | 46 |
| Example 8 | 20 | 3 | 18 | 40 | 85 | 150 | 46 |
| Example 9 | 2 | 30 | 18 | 34 | 85 | 150 | 46 |
| Example 10 | 2 | 30 | 18 | 38 | 85 | 150 | 46 |
| Example 11 | 2 | 30 | 18 | 43 | 85 | 150 | 46 |
| Example 12 | 2 | 30 | 18 | 40 | 80 | 150 | 46 |
| Example 13 | 2 | 30 | 18 | 40 | 85 | 150 | 46 |
| Example 14 | 2 | 30 | 18 | 40 | 90 | 150 | 46 |
| Example 15 | 2 | 30 | 18 | 40 | 110 | 150 | 46 |
| Example 16 | 2 | 30 | 18 | 40 | 85 | 120 | 46 |
| Example 17 | 2 | 30 | 18 | 40 | 85 | 150 | 46 |
| Example 18 | 2 | 30 | 18 | 40 | 85 | 180 | 46 |
| Example 19 | 2 | 30 | 18 | 40 | 85 | 150 | 23 |
| Comparative Example 1 | 0.05 | 0.05 | 18 | 40 | 85 | 150 | 46 |
| Comparative Example 2 | 7 | 7 | 18 | 40 | 85 | 150 | 46 |
| Comparative Example 3 | 0.05 | 30 | 18 | 40 | 85 | 150 | 46 |
| Example 20 | 2 | 30 | 18 | 32 | 85 | 150 | 46 |
| Example 21 | 2 | 30 | 18 | 45 | 85 | 150 | 46 |
| Comparative Example 4 | 2 | 30 | 18 | 40 | 75 | 150 | 46 |
| Example 22 | 2 | 30 | 18 | 40 | 85 | 100 | 46 |
| Example 23 | 2 | 30 | 18 | 40 | 85 | 150 | 18 |
| Example 24 | 2 | 30 | 18 | 40 | 85 | 200 | 46 |
| Example 25 | 2 | 30 | 18 | 40 | 85 | 150 | 55 |
| Comparative Example 5 | 2 | 30 | 8 | 40 | 90 | 150 | 46 |
| Comparative Example 6 | 2 | 30 | 35 | 40 | 90 | 150 | 46 |

(Performance Evaluation of Fine Particle Collecting Filter)

As to the fine particle collecting filters of Examples 1 to 25 and Comparative Examples 1 to 6, evaluations of a soot mass limit (SML), a pressure loss and a PM collecting efficiency were performed by methods which will be described in the following, and the results are shown in Table 2. Moreover, an overall evaluation was performed on the basis of the evaluation results of these respective items by a method which will be described in the following, and the results are shown in the same table.

[Soot Mass Limit (SML)]

Each of the fine particle collecting filters was attached to an exhaust system of a diesel engine, and a soot-including exhaust gas discharged from the diesel engine was allowed to flow into the fine particle collecting filter from an inlet end surface of the filter and flow out from an outlet end surface thereof, so that the soot was deposited in the fine particle collecting filter. Then, after cooling down to room temperature (25° C.) once, a burning gas of 680° C. was allowed to flow into the fine particle collecting filter from the inlet end surface thereof. In this case, when the soot was burnt to decrease a pressure loss of the fine particle collecting filter, a flow rate of the burning gas was decreased, so that the soot was rapidly burnt. Afterward, presence/absence of generation of cracks in the fine particle collecting filter was confirmed. Such a recovery treatment of the fine particle collecting filter was started from a state where an amount of the deposited soot was 4 g/L (the amount of the deposited soot per liter of a volume of the fine particle collecting filter), and repeatedly performed by increasing the amount of the deposited soot every 0.5 g/L until it was recognized that the cracks were generated. The amount of the deposited soot at the generation of the cracks was the soot mass limit (SML). In general, the larger the amount of the deposited soot is, the larger an amount of heat generated at the burning of the soot becomes. Therefore, a heat stress generated in the fine particle collecting filter is also large, and the cracks are easily generated. Therefore, it can be considered that the larger the SML is, the higher a heat stress alleviating effect produced during the recovery is. The filter in which the SML obtained in this manner was 8 g/L or more was evaluated as "preferable", and the filter in which the SML was smaller than 8 g/L was evaluated as "non-preferable".

[Pressure Loss]

When air of room temperature (25° C.) was allowed to flow through each of the fine particle collecting filters at a flow rate of 10 Nm³/minute, pressures on an inlet side (an upstream side) and an outlet side (a downstream side) of the fine particle collecting filter were measured, and a difference in pressure between the sides was calculated, to obtain a pressure loss. The filter in which the pressure loss obtained in this manner was 2.0 kPa or less was evaluated as "preferable", and the filter in which the pressure loss was in excess of 2.0 kPa was evaluated as "non-preferable".

[PM Collecting Efficiency]

Each of the fine particle collecting filters was attached to an exhaust system of a car on which a diesel engine of a displacement of 2 L was mounted. Then, a PM collecting efficiency was calculated from a ratio between a cumulative total of particulates of PM on an inlet side of the fine particle collecting filter and a cumulative total of particulates of PM on an outlet side of the fine particle collecting filter in a case where this car was run in a new European driving cycle (NEDC) mode. Additionally, measurement of the number of the particulates of the PM was performed in accordance with a technique suggested by Particle Measurement Program (abbreviated to "PMP") by the emission gas energy specialist conference of World Forum for Harmonization of Vehicle Regulations in the Economic Commission for Europe. The filter in which the PM collecting efficiency obtained in this way was 90% or more was evaluated as "preferable", and the filter in which the efficiency was smaller than 90% was evaluated as "non-preferable".

[Overall Evaluation]

A value was calculated by formula A×C/B, in which A (g/L) was the SML obtained by the above method, B (kPa) was the pressure loss, and C (%) was the PM collecting efficiency. The filter in which the value was 400 or more was evaluated as "pass", and the filter in which the value was smaller than 400 was evaluated as "failure".

TABLE 2

| | SML | | Pressure loss | | PM collecting efficiency | | Overall evaluation | |
|---|---|---|---|---|---|---|---|---|
| | (g/L) | Evaluation | (kPa) | Evaluation | (%) | Evaluation | A × C/B | Evaluation |
| Example 1 | 10 | Preferable | 1.8 | Preferable | 99.9 | Preferable | 555.0000 | Pass |
| Example 2 | 10 | Preferable | 1.7 | Preferable | 99.7 | Preferable | 586.4706 | Pass |
| Example 3 | 10 | Preferable | 1.5 | Preferable | 99.5 | Preferable | 663.3333 | Pass |
| Example 4 | 10 | Preferable | 1.5 | Preferable | 99.3 | Preferable | 662.0000 | Pass |
| Example 5 | 10 | Preferable | 1.7 | Preferable | 99.8 | Preferable | 587.0588 | Pass |
| Example 6 | 10 | Preferable | 1.6 | Preferable | 99.7 | Preferable | 623.1250 | Pass |
| Example 7 | 10 | Preferable | 1.4 | Preferable | 99.5 | Preferable | 710.7143 | Pass |
| Example 8 | 10 | Preferable | 1.4 | Preferable | 99.3 | Preferable | 709.2857 | Pass |
| Example 9 | 10 | Preferable | 1.4 | Preferable | 99.3 | Preferable | 709.2857 | Pass |
| Example 10 | 10 | Preferable | 1.4 | Preferable | 99.3 | Preferable | 709.2857 | Pass |
| Example 11 | 10 | Preferable | 1.4 | Preferable | 99.3 | Preferable | 709.2857 | Pass |
| Example 12 | 10 | Preferable | 1.4 | Preferable | 99.3 | Preferable | 709.2857 | Pass |
| Example 13 | 10 | Preferable | 1.4 | Preferable | 99.3 | Preferable | 709.2857 | Pass |
| Example 14 | 10 | Preferable | 1.4 | Preferable | 99.3 | Preferable | 709.2857 | Pass |
| Example 15 | 10 | Preferable | 1.4 | Preferable | 99.3 | Preferable | 709.2857 | Pass |
| Example 16 | 9 | Preferable | 1.3 | Preferable | 99.3 | Preferable | 687.4615 | Pass |
| Example 17 | 10 | Preferable | 1.4 | Preferable | 99.3 | Preferable | 709.2857 | Pass |
| Example 18 | 11 | Preferable | 1.5 | Preferable | 99.3 | Preferable | 728.2000 | Pass |
| Example 19 | 9 | Preferable | 1.2 | Preferable | 99.3 | Preferable | 744.7500 | Pass |
| Comparative Example 1 | 10 | Preferable | 3.0 | Non-preferable | 99.9 | Preferable | 333.0000 | Failure |
| Comparative Example 2 | 10 | Preferable | 1.4 | Preferable | 45.0 | Non-preferable | 321.4286 | Failure |

TABLE 2-continued

|  | SML | | Pressure loss | | PM collecting efficiency | | Overall evaluation | |
| --- | --- | --- | --- | --- | --- | --- | --- | --- |
|  | (g/L) | Evaluation | (kPa) | Evaluation | (%) | Evaluation | A × C/B | Evaluation |
| Comparative Example 3 | 10 | Preferable | 2.8 | Non-preferable | 99.5 | Preferable | 355.3571 | Failure |
| Example 20 | 10 | Preferable | 2.45 | Non-preferable | 99.4 | Preferable | 405.7143 | Pass |
| Example 21 | 7 | Non-preferable | 1.3 | Preferable | 99.3 | Preferable | 534.6923 | Pass |
| Comparative Example 4 | 5 | Non-preferable | 1.4 | Preferable | 99.3 | Preferable | 354.6429 | Failure |
| Example 22 | 6 | Non-preferable | 1.2 | Preferable | 93.5 | Preferable | 467.5000 | Pass |
| Example 23 | 6 | Non-preferable | 1.2 | Preferable | 93.5 | Preferable | 467.5000 | Pass |
| Example 24 | 11 | Preferable | 2.3 | Non-preferable | 92.0 | Preferable | 440.0000 | Pass |
| Example 25 | 11 | Preferable | 2.3 | Non-preferable | 92.0 | Preferable | 440.0000 | Pass |
| Comparative Example 5 | 10 | Preferable | 3.5 | Non-preferable | 99.3 | Preferable | 283.7143 | Failure |
| Comparative Example 6 | 8 | Preferable | 1.4 | Preferable | 60.0 | Non-preferable | 342.8571 | Failure |

(Considerations)

As shown in Table 2, the fine particle collecting filters of Examples 1 to 19 which were the examples of the present invention exerted excellent performances in any evaluation item. Moreover, in the fine particle collecting filter of Example 20 in which the porosity of the partition walls was smaller than 34%, the pressure loss was slightly large, but the SML was large, and the high PM collecting efficiency was shown, so that filter passed the overall evaluation. In the fine particle collecting filter of Example 21 in which the porosity of the partition walls was in excess of 43%, the SML was slightly smaller, but the pressure loss was low, and the high PM collecting efficiency was shown, so that the filter passed the overall evaluation. Also in the fine particle collecting filter of Example 22 in which the thickness of the partition walls was smaller than 120 μm, the SML was slightly smaller, but the pressure loss was low, and the high PM collecting efficiency was shown, so that the filter passed the overall evaluation. Also in the fine particle collecting filter of Example 23 in which the cell density of the honeycomb structure was smaller than 23 cells/cm$^2$, the SML was slightly smaller, but the pressure loss was low, and the high PM collecting efficiency was shown, so that the filter passed the overall evaluation. In the fine particle collecting filter of Example 24 in which the thickness of the partition walls was in excess of 180 μm, the pressure loss was slightly larger, but the SML was large, and the high PM collecting efficiency was shown, so that the filter passed the overall evaluation. Also in the fine particle collecting filter of Example 25 in which the cell density of the honeycomb structure was in excess of 50 cells/cm$^2$, the pressure loss was slightly larger, but the SML was large, and the high PM collecting efficiency was shown, so that the filter passed the overall evaluation.

On the other hand, in the fine particle collecting filter of Comparative Example 1 in which each of the average open diameter of the pores open in the inlet side partition wall surface and the average open diameter of the pores open in the outlet side partition wall surface was smaller than 0.1 μm, the SML was large, and the high PM collecting efficiency could be obtained, but the pressure loss was excessively large, so that the filter failed in the overall evaluation. Also in the fine particle collecting filter of Comparative Example 3 in which one of the average open diameter of the pores open in the inlet side partition wall surface and the average open diameter of the pores open in the outlet side partition wall surface was smaller than 0.1 μm and the other average open diameter was in excess of 5 μm, the evaluation was similar to that of the fine particle collecting filter of Comparative Example 1. Moreover, in the fine particle collecting filter of Comparative Example 2 in which each of the average open diameter of the pores open in the inlet side partition wall surface and the average open diameter of the pores open in the outlet side partition wall surface was in excess of 5 μm, the SML was large, and the pressure loss was small, but the PM collecting efficiency was excessively low, so the filter failed in the overall evaluation. In the fine particle collecting filter of Comparative Example 4 in which the thermal conductivity of the partition walls at room temperature was smaller than 80 W/mK, the pressure loss was small, and the high PM collecting efficiency could be obtained, but the SML was excessively small, so that the filter failed in the overall evaluation. In the fine particle collecting filter of Comparative Example 5 in which the average pore diameter of the whole partition wall was smaller than 10 μm, the SML was large, and the high PM collecting efficiency could be obtained, but the pressure loss was excessively large, so that the filter failed in the overall evaluation. In the fine particle collecting filter of Comparative Example 6 in which the average pore diameter of the whole partition wall was in excess of 30 μm, the SML was large, and the pressure loss was small, but the PM collecting efficiency was excessively low, so that the filter failed in the overall evaluation.

The present invention can suitably be used as a filter for collecting particulate materials included in an exhaust gas of a car engine or the like.

DESCRIPTION OF REFERENCE NUMERALS

1: fine particle collecting filter, 2: honeycomb structure, 3: honeycomb segment, 4: inlet end surface, 5: outlet end surface, 6: coating material, 7: cell, 7a: predetermined cell, 7b: remaining cell, 8: partition wall, 9a: inlet side partition wall surface, 9b: outlet side partition wall surface, 10: plugging portion, 11: outer peripheral wall, and 12: joining material.

What is claimed is:

1. A fine particle collecting filter comprising a honeycomb structure in which a plurality of honeycomb segments are integrally joined by a joining material, each of the honeycomb segments having porous partition walls to define and form a plurality of cells extending from an inlet end surface that becomes an inlet side of an exhaust gas to an outlet end surface that becomes an outlet side of the exhaust gas, and plugging portions to plug open ends on the side of the outlet end surface of the predetermined cells and open ends on the side of the inlet end surface of the remaining cells, the fine particle collecting filter having a constitution where the exhaust gas allowed to flow from the inlet end surface into the cells passes the partition walls, and then flows out from the outlet end surface to the outsides of the cells, wherein the partition walls are made of a material containing SiC as a main component, at least one of an average open diameter of the pores which are open in a surface of each of the partition walls that becomes the inlet side of the exhaust gas passing the partition wall and an average open diameter of the pores which are open in a surface of the partition wall that becomes the outlet side of the exhaust gas passing the partition wall is from 0.1 to 3 µm, an average pore diameter of the whole partition wall is from 10 to 30 µm, and a thermal conductivity of the partition walls at room temperature is from 80 to 110 W/mK.

2. The fine particle collecting filter according to claim 1, wherein a porosity of the partition walls is from 34 to 43%.

3. The fine particle collecting filter according to claim 1, wherein a cell density of the honeycomb structure is from 23 to 50 cells/cm$^2$.

4. The fine particle collecting filter according to claim 2, wherein a cell density of the honeycomb structure is from 23 to 50 cells/cm$^2$.

5. The fine particle collecting filter according to claim 1, wherein a thickness of the partition walls is from 120 to 180 µm.

6. The fine particle collecting filter according to claim 2, wherein a thickness of the partition walls is from 120 to 180 µm.

7. The fine particle collecting filter according to claim 3, wherein a thickness of the partition walls is from 120 to 180 µm.

8. The fine particle collecting filter according to claim 4, wherein a thickness of the partition walls is from 120 to 180 µm.

\* \* \* \* \*